United States Patent
Suh

(12)
(10) Patent No.: US 6,575,656 B2
(45) Date of Patent: Jun. 10, 2003

(54) PULL PIN ASSEMBLY FOR CANOPY

(75) Inventor: Dong Tack Suh, Seoul (KR)

(73) Assignee: Caravan Canopy International, Inc., Compton, CA (US)

( * ) Notice: Subject to any disclaimer, the term of this patent is extended or adjusted under 35 U.S.C. 154(b) by 0 days.

(21) Appl. No.: 09/863,282

(22) Filed: May 24, 2001

(65) Prior Publication Data

US 2002/0179134 A1 Dec. 5, 2002

(51) Int. Cl.[7] .................................................. F16B 7/10
(52) U.S. Cl. ............................... 403/109.6; 403/109.1; 403/379.5; 135/131; 135/114; 135/142
(58) Field of Search ................................. 135/140, 141; 403/324, 325, 326, 327, 109.1, 109.3, 109.6, 108, 378, 379.2, 379.5, 379.6, 106, 107, 329; 70/145, 90; 292/175, 60; 15/315; 211/172

(56) References Cited

U.S. PATENT DOCUMENTS

| | | | | | |
|---|---|---|---|---|---|
| 24,450 A | * | 6/1859 | Emery | ........................ | 292/175 |
| 1,352,624 A | * | 9/1920 | Polcek | ........................ | 292/175 |
| 2,076,897 A | * | 4/1937 | Kistner | ........................ | 70/90 |
| 3,255,721 A | * | 6/1966 | Peterschmidt | .............. | 108/159 |
| 3,298,723 A | * | 1/1967 | Damm | .................... | 294/82.35 |
| 3,603,628 A | * | 9/1971 | Smith et al. | ................ | 403/172 |
| 3,606,372 A | * | 9/1971 | Browning | .................. | 16/113.1 |
| 4,733,625 A | * | 3/1988 | Allen | .................... | 114/230.28 |
| 4,917,442 A | * | 4/1990 | Johnson | .................. | 301/111.05 |
| 5,031,266 A | * | 7/1991 | Tillman et al. | ............ | 15/327.2 |
| 5,794,640 A | | 8/1998 | Jang | | |
| 5,944,040 A | | 8/1999 | Jang | | |
| 6,152,157 A | * | 11/2000 | Jang | ........................... | 135/126 |
| 6,230,910 B1 | * | 5/2001 | Olsson et al. | ............... | 211/192 |
| 6,338,586 B1 | * | 1/2002 | Kuo | ........................ | 16/113.1 |

FOREIGN PATENT DOCUMENTS

| | | | |
|---|---|---|---|
| FR | 26436 | * | 12/1923 |
| GB | 8959 | * | of 1891 |
| GB | 24959 | * | of 1911 |

* cited by examiner

Primary Examiner—Lanna Mai
Assistant Examiner—John Fitzgerald
(74) Attorney, Agent, or Firm—Griffin & Szipl, P.C.

(57) ABSTRACT

A pull pin assembly includes: a first pole having a first hole; a second pole having a second hole, and sliding in the first pole; a main body having a central hollow containing the first pole; a pull pin body extending radially from the central hollow, and having a space extending into the central hollow; a pull pin, having a circumferential stop, disposed in the space to move from a first position extending into the central hollow through the first hole to a second position outside the central hollow; a pull pin plug fit into the space and having a hollow containing the pull pin; and a biasing member biasing the pull pin toward the second position to lock the first and second poles; wherein the biasing member is disposed to bias the pull pin between the circumferential stop and the pull pin plug.

14 Claims, 4 Drawing Sheets

PULL PIN ASSEMBLY FOR CANOPY

FIELD OF THE INVENTION

The present invention relates to a pull pin assembly, particularly to a pull pin assembly for a portable canopy. More particularly, the present invention relates to a pull pin assembly that is easy to produce, assemble, and use.

BACKGROUND OF THE INVENTION

Portable canopies are known which fold out, and expand or telescope from a compact, storable state to an expanded, folded out and erected state. Such canopies have wide application, for example, for various recreational uses, and as temporary shelters. Such canopies also have wide application for commercial uses, such as temporary sales booths or display booths for conventions, fairs, and the like.

One such typical canopy is shown in FIG. 1. In the FIG. 1, canopy 10 comprises a frame 4, on which a canopy cover 5 and side panels 6 and 7 are draped. The frame 4 comprises a roof of expandable scissor-like members 9, four supporting telescoping corner uprights 8, and two side rails 3. The supporting corner uprights 8 further comprise telescoping poles or rods 11 and 12, and a locking means 1, for locking the poles or rods 11 and 12 in a desired expanded position. The locking means for locking poles or rods 11 and 12 in the erected, expanded position have traditionally been difficult to assemble and mount, unnecessarily complicated, and often unreliable.

SUMMARY OF THE INVENTION

It is therefore an object of the present invention to provide a locking means, particularly one for a portable canopy, which is easy to assemble, easy to mount, uncomplicated and reliable.

In accordance with the present invention there is provided a pull pin assembly comprising: a first rod or pole, having a first hole and a second notch or hole, and a second rod or pole, having third hole, the second rod or pole being slidably contained within the first rod or pole, so that the first hole is superimposable on the second hole. A main body is provided having a central hollow dimensioned to contain the first rod or pole, and having at least one resilient tab, the resilient tab being cut out from the main body and having a boss thereon extending into the central hollow to engage the second notch or hole of the first rod or pole. A pull pin body is provided integral with the main body and extending radially outward from the central hollow, the pin body having a space therein extending into the central hollow. A pull pin is slidably disposed in the space of the pull pin body to move from a first position extending into the central hollow through the first hole to a second position outside of the central hollow. A biasing member biases the pull pin toward the second position to relatively lock the first rod or pole and the second rod or pole when the first hole is superimposed on the second hole.

The pull pin assembly according to the present invention preferably further comprises a pull pin plug fit into the space of the pin body, the pull pin plug having a hollow dimensioned to slidably contain the pull pin, the pull pin also having a circumferential stop, wherein the biasing member is disposed to bias the pull pin between the circumferential stop and the pull pin plug, and wherein the circumferential stop is dimensioned to prevent the pull pin from passing completely through the first hole in the second position.

In a further embodiment, the pull pin comprises a circumferential tongue, wherein said pull pin plug comprises a radial groove, wherein, the pull pin has a first engageable position in which the circumferential tongue is movable in the radial groove, and a second, disengaged position, wherein the pull pin is radially pulled against a biasing force of the biasing member to come out of the radial groove and rotated so that the circumferential tongue is biased against the pull pin plug.

The pull pin plug is friction fit into the space of the pull pin body. In a still further embodiment, the pull pin comprises a radial hole near a distal end removed from the central hollow, and further comprising a pull ring disposed in the radial hole to prevent the pull pin from passing completely through the pull pin body.

The central hollow, first rod or pole and second rod or pole all preferably have square cross sections. The main body preferably further comprises a lip disposed to engage and end of said first rod or pole. The pull pin plug is preferably countersunk and friction fit into the pull pin body.

In a still further embodiment, the present invention provides a pull pin assembly, comprising: a rod or pole, having a hole; and a main body, having a central hollow dimensioned to contain the rod or pole. A pull pin body is preferably provided integral with the main body and extending radially outward from the central hollow, the pin body having a space therein extending into the central hollow. A pull pin is slidably disposed in the space of the pull pin body to move from a first position extending into the central hollow through the first hole to a second position outside of the central hollow, the pull pin having a circumferential stop. A pull pin plug is fit into the space of the pin body, the pull pin plug having a hollow dimensioned to slidably contain the pull pin. A biasing member is provided biasing the pull pin toward the second position to relatively lock the first rod or pole and the second rod or pole when the first hole is superimposed on the second hole. In this embedment, the biasing member is disposed to bias the pull pin between the circumferential stop and the pull pin plug, and wherein the circumferential stop is dimensioned to prevent the pull pin from passing completely through the first hole in the second position. Preferably, the pull pin comprises a circumferential tongue, wherein the pull pin plug comprises a radial groove, wherein, the pull pin has a first engageable position in which the circumferential tongue is movable in the radial groove, and a second, disengaged position, wherein the pull pin is radially pulled against a biasing force of the biasing member to come out of the radial groove and rotated so that the circumferential tongue is biased against the pull pin plug.

Further objects, features and advantages of the present invention will become apparent from the Detailed Description of Preferred Embodiments, which follows, when considered together with the attached Figures.

DETAILED DESCRIPTION OF THE PREFERRED EMBODIMENTS

Figure 1:
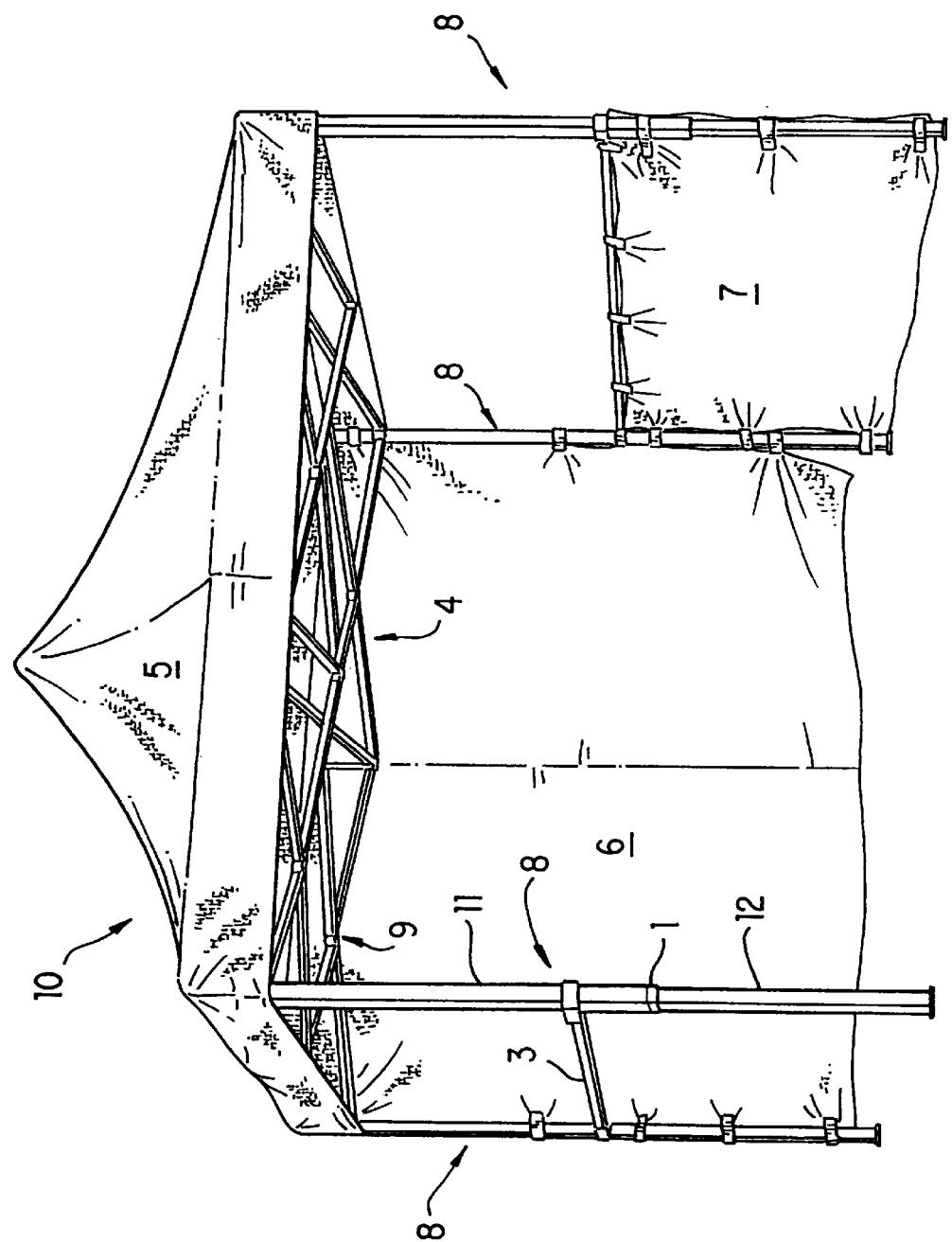
FIG. 1 is a typical, portable canopy, such as one in which the present invention may be applied.

The pull pin assembly of the present invention will now be described, with reference to the drawings and in relation to certain preferred embodiments. In the Figs., like parts are referred to with like reference numerals.

Figure 2:
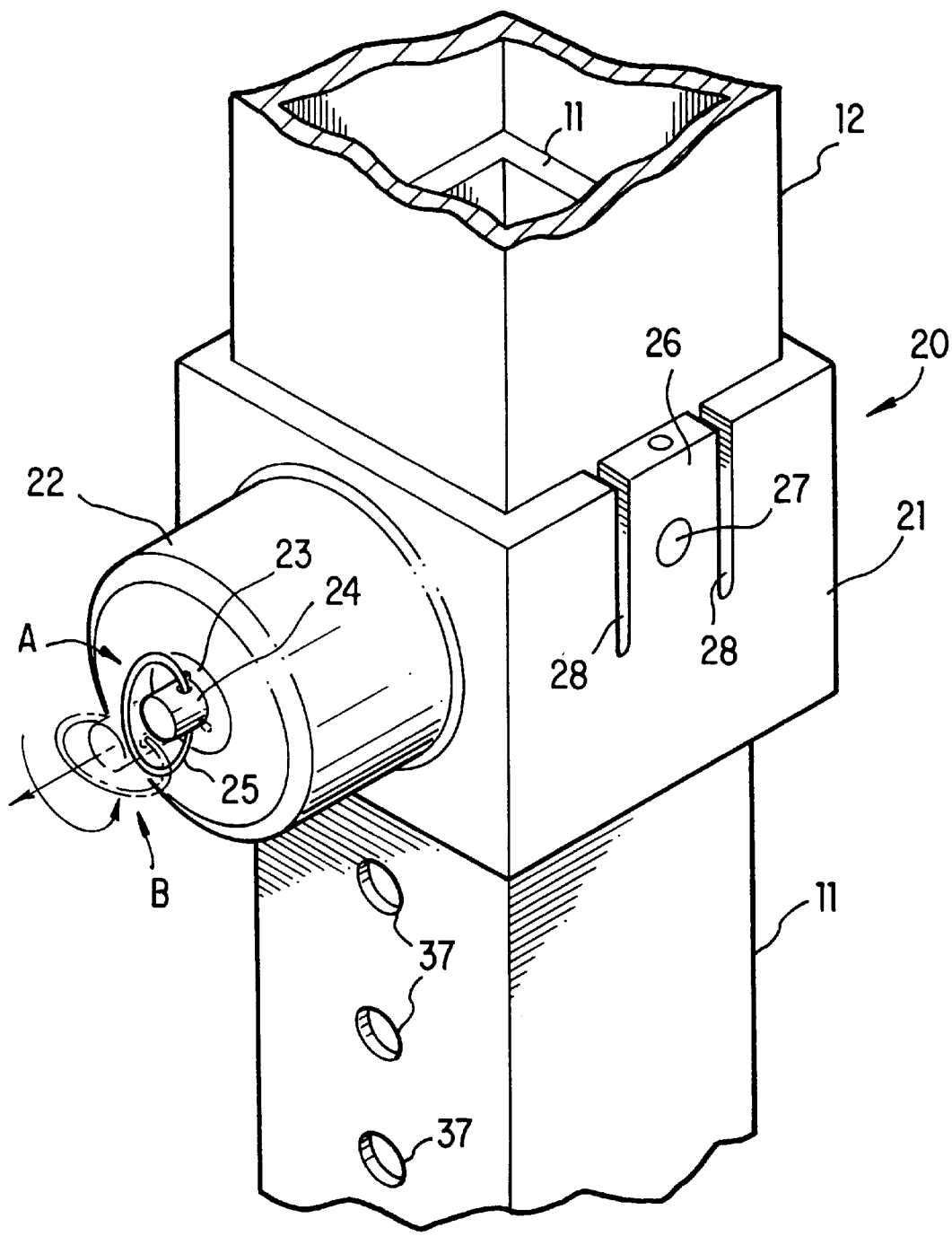
FIG. 2 is a partially cut-away, perspective view of a pull pin assembly according to a preferred embodiment of the present invention.
Figure 6:
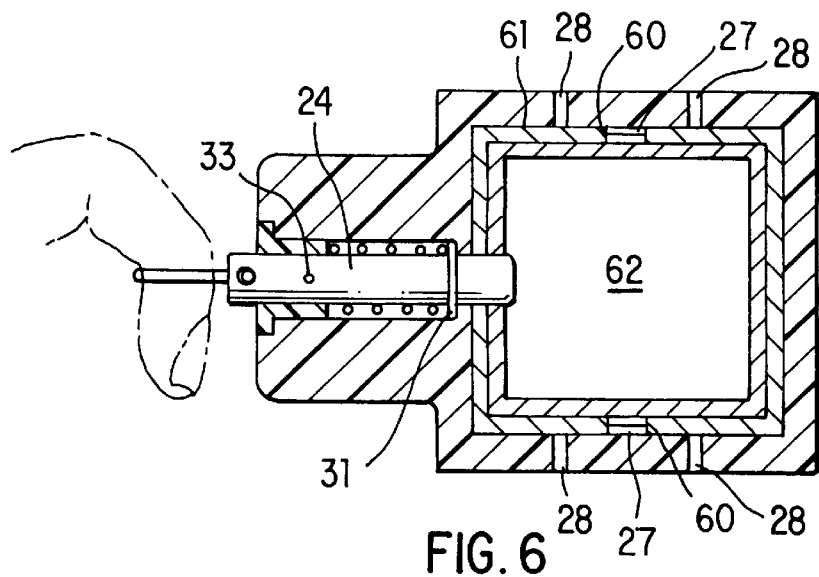
FIG. 6 is a top view cross section of the pull pin assembly of the present invention.

FIG. 2 shows a preferred embodiment of the pull pin assembly 20 of the present invention. Main body 21 is fit over an end of pole 12 of an upright 8 of portable canopy 10. A resilient tab 26 is cut out from main body 21 by slots 28, and a boss 27 on tab 26 engages a hole 60 to fix the main body 21 to the assembly. In this manner, the main body can be easily fixed to pole 12 without the necessity of special tools or adhesives. While the body 21 is also preferably friction fit to pole 12, tab 26 and boss 27 ensure that the main body 21 is securely fit to pole 12, without the necessity for precise tolerances. While only one tab 26 is visible in FIG. 2, the preferred embodiment has a corresponding, symmetrically-arranged second tab 26 on a side of pole 11 not seen in the FIG. 2. A second boss 27 fit into second hole 60 is shown in FIG. 6. The number size, and dimensions of resilient tabs 26 can be varied, however.

A pull pin body 22, integral with main body 21 extends radially outward from main body 21. A pull pin 24 is slidably contained in the pull pin body 22. At a distal end of pull pin 24 is a pull ring 25 fitted through a transverse hole 34 at the distal end of pull pin 24. As will be discussed further below, pulling pull pin 24 from a first position in which the pin extends through two superimposed holes 36, 37 into a central hollow 62 of the assembly to a second position outside of the hollow, releases pole 11 from pole 12 so as to allow relative movement of poles 11, 12 in the direction of the double headed arrow of FIG. 3. In the present embodiment, poles 11 and 12 have a square cross section.

Figure 3:
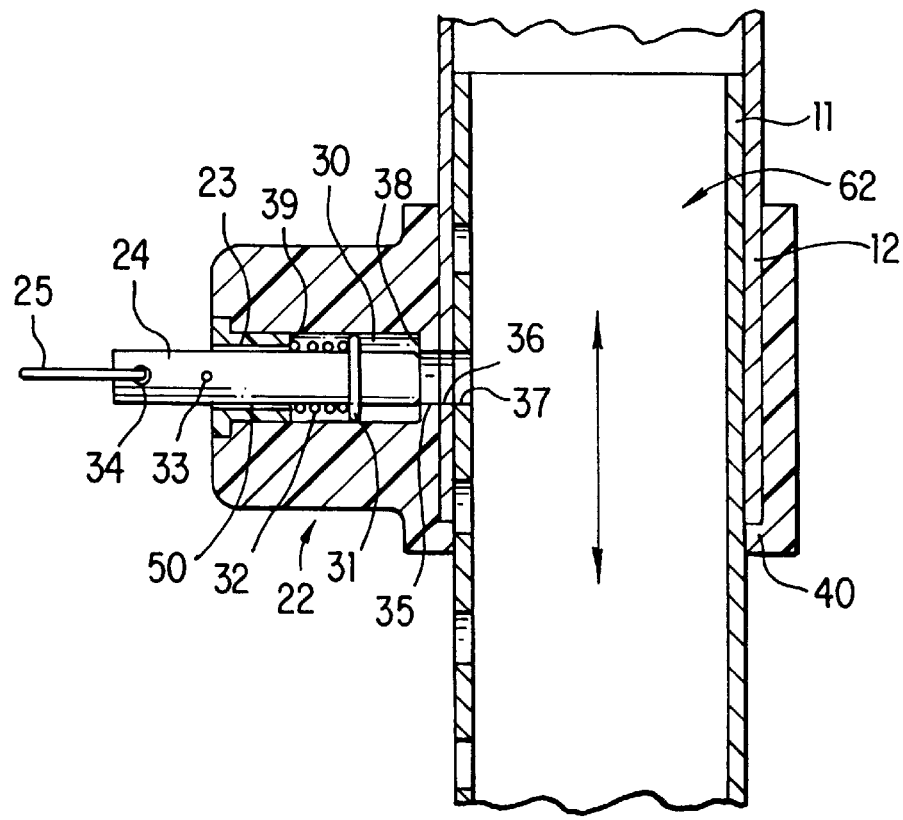
FIG. 3 is a cross section of the pull pin assembly of the present invention.

FIG. 3 shows a cross section of the assembly according to the present invention. In FIG. 3, pull pin 24 is shown in the second position, outside of central hollow 62. As discussed above, pull pin 24 is slidably contained inside pull pin body 22 within a space 30 and a hole 51 in plug 23. Plug 23 is countersunk and preferably friction fit into pull pin body 22 to maintain its position. A spring 32 serves as a biasing member to bias the pull pin 24 toward the first position in which the pull pin 24 extends into the central space 62. Spring 32 acts between an inner surface 39 of plug 23 and a circumferential stop 31 of pull pin 24. A hole 35 is provided at the end of space 30 closest to the central hollow 62. The hole 35 is surrounded by a circumferential ledge 38 having a circumference substantially the same as space 30. In FIG. 3, hole 35 is superimposed on likewise superimposed holes 36 and 37 of poles 12 and 11, respectively. Also shown in FIG. 3, is lip 40 of main body 21. Lip 40 serves not only to protect the end of pole 12 from damage, but also to guide pole 11 as it slides in and out of pole 12 in a telescopic manner to extend and collapse upright 8.

Figure 4:
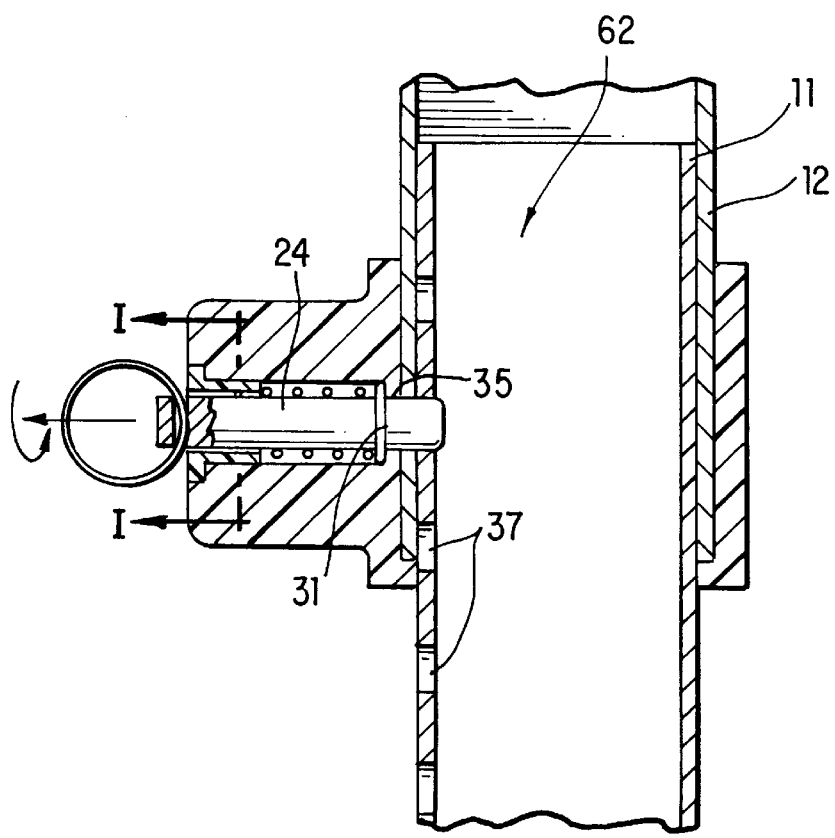
FIG. 4 is a further cross section of the pull pin assembly of the present invention.

FIG. 4 shows a cross section identical to FIG. 3, except that pull pin 24 is in the first position, extending through holes 35, 36, 37 into central hollow 62, thus locking poles 11 and 12 together. FIG. 4 also shows that circumferential stop 31 also serves to prevent more than a predetermined length of pull pin 24 from extending past hole 35, by abutting against circumferential ledge 38.

Figure 5:
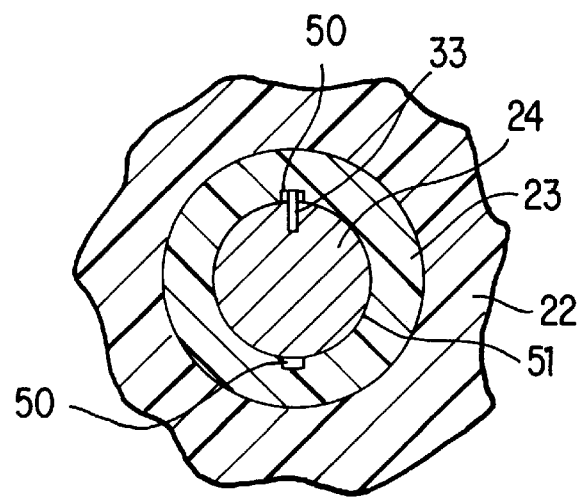
FIG. 5 is yet another cross section of the pull pin assembly of the present invention taken alone the line I—I in FIG. 4.

FIG. 5 shows a cross section along line I—I in FIG. 4. As shown in FIG. 5, a tongue 33 is provided on the outer circumference of pull pin 24. Tongue 33 slides within a groove 50 provided in hole 51 of plug 23. As shown in FIG. 2, when the pull pin 24 is moved from the first position to the second position, tongue 33 comes out of groove 50 allowing pull pin 24 to be rotated from position A to position B. In position B, the groove is biased toward an outer surface of plug 23 and the pin is held by friction in the second position. In this locked, second position, the poles 11 and 12 are, of course, free to move relative to one another and the upright 8 can be extended or collapsed, as desired. Pull pin 24 is moved from position B to position A by pulling pull pin 24, by means of pull ring 25, slightly outward against the biasing force of spring 32, rotating pull pin 24 by means of ring 25, positioning tongue 33 at an entrance to groove 50 and releasing pull ring 25 so that pull pin 24 once again moves toward the first position by the biasing force of spring 33. Also shown in FIG. 2 are several holes 37, each of which can be superimposed on holes 35 and 36, so that, when the pull pin is moved back through holes 35, 36, 37 to the first position, poles 11 and 12 are once again relatively locked together as shown, for example, in FIG. 4.

As shown in FIG. 5, groove 50 is provided on opposite sides of hole 51 in plug 23. Groove 50 may also be provided on only one side of hole 51. More than one groove 50 can also be provided, if desired. It is further possible to leave out the function represented by tongue 33 and groove 50 so that pull pin 24 rotates freely within hole 51, in cases where it is not necessary for the pull pin 24 to be lockable in the second position.

FIG. 6 is a top view cross-section showing the pin 24 in the first, locked position. In the embodiment described above, as can be seen for example in FIG. 6, poles 11, 12, central space 62 and inner wall 61 of main body 21 that defines central space 62 are all square in cross section. Other functional shapes are possible however. Triangular, rectangular, hexagonal, octagonal, circular, oval and other useful geometric cross sections also fall within the scope of the present invention.

While the present invention has been described in terms of certain preferred embodiments, one of ordinary skill in the art of the invention will recognize that additions, deletions, substitutions, modifications and improvements can be made while remaining within the scope and spirit of the invention as defined by the attached claims.

What is claimed is:

1. A pull pin assembly, comprising:
   a first rod or pole, having a first hole and a second notch or hole;
   a second rod or pole, having third hole, the second rod or pole being slidably contained within the first rod or pole, so that the first hole is superimposable on the third hole;
   a main body, having a central hollow dimensioned to contain the first rod or pole, and having at least one resilient tab, the resilient tab being cut out from the main body and having a boss thereon extending into the central hollow to engage the second notch or hole of the first rod or pole;
   a pull pin body integral with the main body and extending radially outward from the central hollow, said pin body having a space therein extending into the central hollow;
   a pull pin slidably disposed in the space of the pull pin body to move from a first position extending into the central hollow through the first hole to a second position outside of the central hollow; and a biasing member biasing the pull pin toward the second position to relatively lock the first rod or pole and the second rod or pole when the first hole is superimposed on the third hole.

2. A pull pin assembly according to claim 1 further comprising a pull pin plug fit into the space of the pin body, the pull pin plug having a hollow dimensioned to slidably contain the pull pin, said pull pin having a circumferential stop, wherein the biasing member is disposed to bias the pull pin between the circumferential stop and the pull pin plug, and wherein the circumferential stop is dimensioned to prevent the pull pin from passing completely through the first hole in the second position.

3. A pull pin assembly according to claim 2, wherein said pull pin comprises a circumferential tongue, wherein said pull pin plug comprises a radial groove, wherein, the pull pin has a first engageable position in which the circumferential tongue is movable in the radial groove, and a second, disengaged position, wherein the pull pin is radially pulled against a biasing force of the biasing member to come out of the radial groove and rotated so that the circumferential tongue is biased against the pull pin plug.

4. A pull pin assembly according to claim 3, wherein the pull pin plug is friction fit into the space of the pull pin body.

5. A pull pin assembly according to claim 3, wherein the pull pin comprises a traverse hole near a distal end removed from the central hollow, and further comprising a pull ring disposed in the transverse hole to prevent the pull pin from passing completely through the pull pin body.

6. A pull pin assembly according to claim 2, wherein the pull pin plug is friction fit into the space of the pull pin body.

7. A pull pin assembly according to claim 2, wherein the pull pin comprises a transverse hole near a distal end removed from the central hollow, and further comprising a pull ring disposed in the transverse hole to prevent the pull pin from passing completely through the pull pin body.

8. A pull pin assembly according to claim 2, wherein said pull pin plug is countersunk and friction fit into said pull pin body.

9. A pull pin assembly according to claim 1, wherein the pull pin plug is friction fit into the space of the pull pin body.

10. A pull pin assembly according to claim 1, wherein the pull pin comprises a transverse hole near a distal end removed from the central hollow, and further comprising a pull ring disposed in the transverse hole to prevent the pull pin from passing completely through the pull pin body.

11. A pull pin assembly according to claim 1, wherein the central hollow, first rod or pole and second rod or pole all have square cross sections.

12. A pull pin assembly according to claim 1, wherein said main body further comprises a lip disposed to engage an end of said first rod or pole.

13. A pull pin assembly, comprising:
a first rod or pole, having a first hole;
a second rod or pole, having a second hole, the second rod or pole being slidably contained within the first rod or pole, so that the first hole is superimposable on the second hole;
a main body, having a central hollow dimensioned to contain the first rod or pole;
a pull pin body integral with the main body and extending radially outward from the central hollow, said pin body having a space therein extending into the central hollow;
a pull pin slidably disposed in the space of the pull pin body to move from a first position extending into the central hollow through the first hole to a second position outside of the central hollow, said pull pin having a circumferential stop;
a pull pin plug fit into the space of the pin body, the pull pin plug having a hollow dimensioned to slidably contain the pull pin; and
a biasing member biasing the pull pin toward the second position to relatively lock the first rod or pole and the second rod or pole when the first hole is superimposed on the second hole;
wherein the biasing member is disposed to bias the pull pin between the circumferential stop and the pull pin plug, and wherein the circumferential stop is dimensioned to prevent the pull pin from passing completely through the first hole in the second position.

14. A pull pin assembly according to claim 13, wherein said pull pin comprises a circumferential tongue, wherein said pull pin plug comprises a radial groove, wherein, the pull pin has a first engageable position in which the circumferential tongue is movable in the radial groove, and a second, disengaged position, wherein the pull pin is radially pulled against a biasing force of the biasing member to come out of the radial groove and rotated so that the circumferential tongue is biased against the pull pin plug.

* * * * *